W. E. WILLIAMS.
METHOD OF MANUFACTURING WHEELS.
APPLICATION FILED OCT. 30, 1912.

1,110,092.

Patented Sept. 8, 1914.

2 SHEETS—SHEET 1.

Witnesses:

Inventor:
W. E. Williams

W. E. WILLIAMS.
METHOD OF MANUFACTURING WHEELS.
APPLICATION FILED OCT. 30, 1912.
1,110,092.
Patented Sept. 8, 1914.
2 SHEETS—SHEET 2.
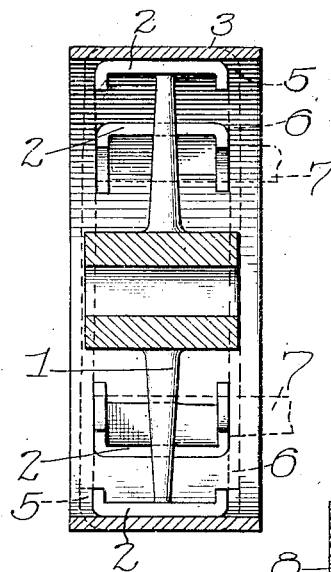
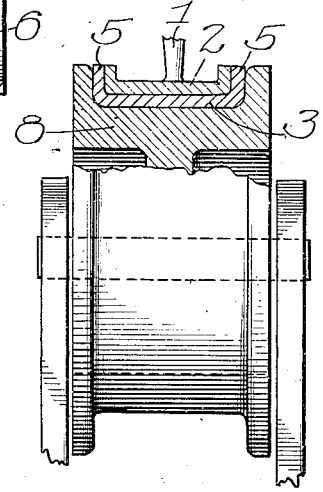
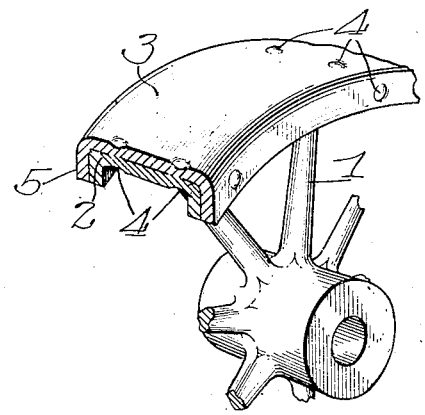
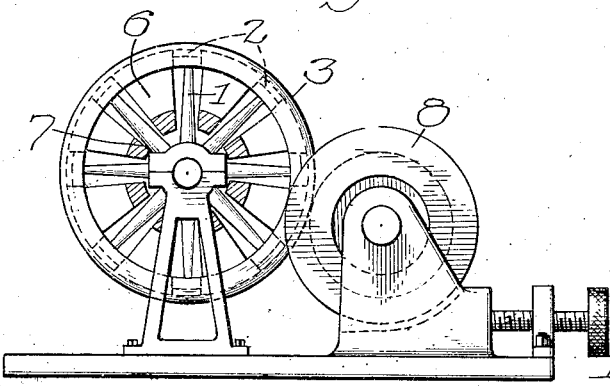

UNITED STATES PATENT OFFICE.

WILLIAM ERASTUS WILLIAMS, OF CHICAGO, ILLINOIS.

METHOD OF MANUFACTURING WHEELS.

1,110,092.   Specification of Letters Patent.   Patented Sept. 8, 1914.

Application filed October 30, 1912. Serial No. 728,547.

*To all whom it may concern:*

Be it known that I, WILLIAM ERASTUS WILLIAMS, a citizen of the United States, and a resident of Chicago, county of Cook, and State of Illinois, with a post-office address of No. 331 South Clinton street, have invented a new and useful Improvement in the Method of Manufacturing Wheels, as set forth in the annexed specification.

The object of my invention is to make metal wheels of a strong pattern, cheaply and true to dimensions. The wheels made by my method are chiefly used on vehicles and for belt pulleys, but may be used for other purposes. The wheels made by my method are provided with a wrought or malleable rim, and the invention relates chiefly to the means employed in making the rim and applying, or affixing the rim to the spider, or spokes. In making cast steel and other cast wheels, the rims are usually turned in order to make them true. With wheels having wrought rims, the rims are rolled as nearly true as they can get them, measured by the need of accuracy and within the permissible cost. In addition to the rolling, those rims are also sometimes ground and sometimes they are turned. In either case, the making of the rims true by rolling, grinding, or machining, costs money, and to save this cost, is one of the chief objects of my invention.

Reference will now be had to the accompanying drawings in which—

Figure 1:
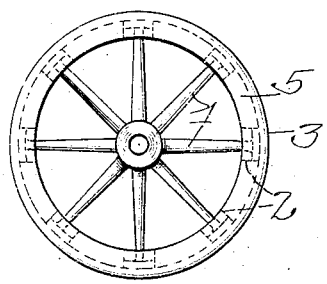
Figure 2:
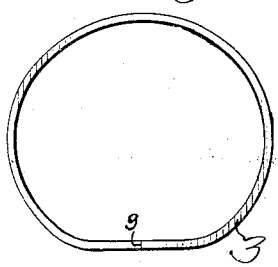
Figure 3:
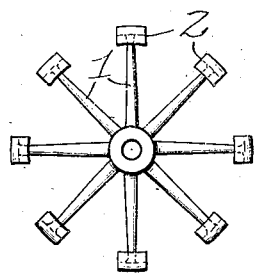
Figure 4:
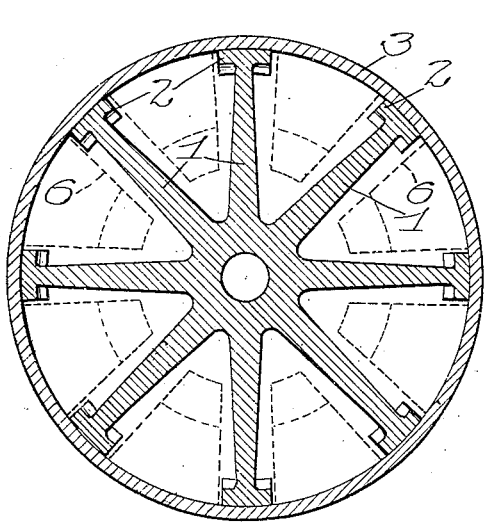
Figure 5:
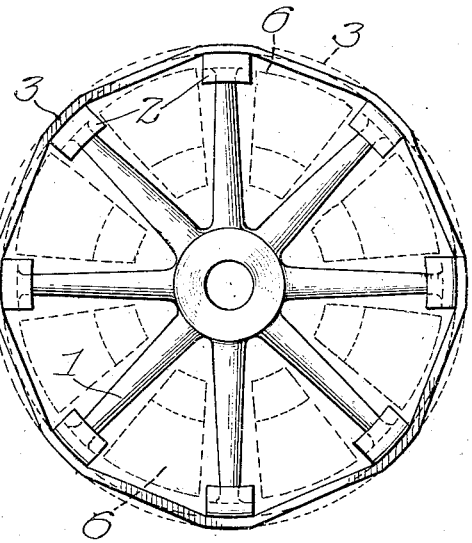

Figure 1 shows an elevation of a finished wheel made by my method. Fig. 2 shows the band or rim ready made to apply to the spider. Fig. 3 shows the spider ready to have the band applied. Fig. 4, shows the wheel with the band applied and before the flanges of the rim are turned. Fig. 5, is a diagram showing a modification of the method. Fig. 6 shows a vertical section through Fig. 4. Fig. 7, shows a perspective view of a section of a finished wheel. Fig. 8, shows a section through the roll that bends over the rim flanges. Fig. 9 is a diagram suggesting a machine for bending in the rim on the edges to form the rim flanges.

The first step in my method is to form the spider, (1) or what is known as the hub and spokes. This may be done in any suitable manner, making them out of any suitable material such as cast iron, cast steel, malleable iron, or of a forged or fabricated structure, but I prefer to use a cast steel spider. In place of a spider or spokes, a disk of any suitable form may be used. The next step after the spider is formed is to make the ends (2) of the spider arms, or the periphery of the disk, (if a disk is used,) true to the diameter required and in proper form to receive the rim. This truing of the ends, (2) of the spider arms, may be done by cold pressing with suitable dies or rolls, or by grinding with an automatic machine, or by hand, or the truing may be accomplished by a milling machine, or by any suitable machinery. After the spider, web, or center is made as described, it is then ready to receive the rim.

The rim, (3) is made preferably of a rolled steel bar cut to desired length and formed up into a ring, and then the joint 9 of the ring is welded by electricity, or by any suitable means. Rolled metal is much stronger than the same material cast to form, and for sections such as wheel rims, the rolled sections cost less than the cast sections. The cast sections are always uncertain on account of blow holes and shrinkage cracks in the castings. Further, cast sections must always be machined for the class of wheels for which my method is desirable, and thus metal must be provided in the casting that is to be machined off as waste, or lost weight, in chips which the foundry charges for the same as the net weight of casting. I prefer to use a flat-bar rolled section for my rims but I may use some forms of channel or other sections. The flat bar section is usually the cheapest, and my methods enable me to get this advantage. In rolling up my rims for welding, no care need be taken to get them true, nor need there be especial care in getting the bars or rings of exact length or size, within a given range. After the rim is welded and the bur of the weld removed the rim is placed over a form of an expanding machine and it is stretched to exact size and the right form. This may be done in any suitable machine but I prefer to use a die block made in parts which can be moved to vary the diameter of the block. The block being made of a diameter less than that desired for the rim the latter is readily placed thereon, and the block is then forcibly expanded by suitable mechanism to stretch the rim beyond its limit of elasticity, so that when released it will have, permanently, the exact size and form desired. The rim thus made is now pressed upon the spider or disk, (1) and is permanently secured thereto by riveting, or spot-welding at the points (4) thus completing the wheel.

Automobile truck and some other wheels require an internal flange or flanges, (5) on the edges of the rim (3). In this event, the method of manufacture is such that one or both of the flanges may be turned or bent in after the rim has been placed upon the spider. See Fig. 6, where the flanges are shown in dotted lines after they have been bent down from the edges of the rim.

In Figs. 4 and 6, I indicate by dotted lines the expanding blocks (6) of the expanding die which may be connected in any suitable manner to any suitable mechanism for actuating them for expanding purposes. The projections, (7) on the blocks may form a connection for such purpose. By placing the spider (1) in the embrace of these blocks (6) and then putting on the rim, the construction may be such that the whole is revolved together and the flanges (5) turned inward by suitable rolls (8) provided and adjusted for the purpose. A suggestion for such a machine is shown by Fig. 9. In place of expanding the rim to a true form before I place it upon the spider, I may force it on the spider in any manner that may be convenient, allowing the untrue rim to assume any shape that it will, but of necessity it will then assume a form somewhat like that shown by Fig. 5, owing to the fact that the rim is necessarily made smaller to allow for the expanding, truing feature. Thus when the rim is put upon the spider before truing, it will appear like a polygon with the flat spaces coming between the spokes, or spider arm ends (2) and the angles at those points. From the position of the full lines indicating the rim in Fig. 5, the rim may then be expanded by blocks (6) to true size, as indicated by the dotted rim lines in Fig. 5. In place of expanding the rims when they are cold, as described, I may heat the rims and place them over the spider and expanding die, and while hot, roll or die down the flanges to the position desired, and then let the rim cool down to normal temperature, or cool it quickly by a stream of water, or other suitable means, the expanding die and spider, meantime holding the rim against any contraction below its desired or true shape until the metal sets, or stretches permanently under the cooling; then by releasing the expanding die, the wheel may be removed finished as relates to the form of the rim. By this method, there is no waste of material, and a true wheel is made with the least labor and no skilled labor is required.

What I claim is,

1. The method of making wheels which consists in making a spider or center of desired size, making separately a rim normally of inadequate length, and assembling the two parts thus formed, the rim being given, permanently, the desired length and shape by expanding it mechanically.

2. The method of making wheels which consists in making separately a spider or center of desired size and a rim normally undersized and assembling the two parts thus formed, the rim being given, permanently, the desired form and size by expanding it mechanically.

3. The method of making wheels which consists in making a spider or center of desired size, making a rim of less than desired size and approximately circular form, assembling and revolubly holding the two parts, the rim being forcibly expanded to proper size, and marginally flanging the rim while rotating the assembled parts.

4. The method of making wheels which consists in making a spider or web center finished at its points of juncture with a rim, making a distinct rim unfinished as to form and size, mechanically stretching said rim to finished size and outline, joining the rim to the center, and flanging the rim marginally.

5. The method of making wheels which consists in making a spider of desired diameter, independently making an undersized rim, mechanically stretching the rim to exact size and form, and permanently fixing it to the spider or center at suitable points.

In witness whereof, I have hereunto subscribed my name in the city of Chicago, State of Illinois, on the 26th day of October, 1912, in the presence of two subscribing witnesses.

WILLIAM ERASTUS WILLIAMS.

Witnesses:
V. J. BASENER,
W. S. WILLIAMS.